United States Patent
Tuzel et al.

(10) Patent No.: US 9,558,268 B2
(45) Date of Patent: Jan. 31, 2017

(54) METHOD FOR SEMANTICALLY LABELING AN IMAGE OF A SCENE USING RECURSIVE CONTEXT PROPAGATION

(71) Applicant: Mitsubishi Electric Research Laboratories, Inc., Cambridge, MA (US)

(72) Inventors: Oncel Tuzel, Winchester, MA (US); Ming-Yu Liu, Revere, MA (US); Abhishek Sharma, College Park, MD (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 342 days.

(21) Appl. No.: 14/463,806

(22) Filed: Aug. 20, 2014

(65) Prior Publication Data

US 2016/0055237 A1    Feb. 25, 2016

(51) Int. Cl.
  *G06K 9/62* (2006.01)
  *G06F 17/30* (2006.01)
  *G06K 9/00* (2006.01)

(52) U.S. Cl.
  CPC ... *G06F 17/30707* (2013.01); *G06F 17/30247* (2013.01); *G06K 9/00523* (2013.01); *G06K 9/00536* (2013.01); *G06K 9/6202* (2013.01); *G06K 9/6267* (2013.01); *G06K 2009/6213* (2013.01)

(58) Field of Classification Search
  CPC .............. G06F 17/30707; G06F 17/30247; G06K 9/0523

USPC ....... 382/170, 171, 190, 219, 224, 278, 275; 358/3.26, 3.27, 537, 538, 463
See application file for complete search history.

(56) References Cited

U.S. PATENT DOCUMENTS

| | | | | |
|---|---|---|---|---|
| 7,127,087 B2 * | 10/2006 | Huang | ............... | G06K 9/00228 340/5.52 |
| 7,333,963 B2 * | 2/2008 | Widrow | ............ | G06F 17/30247 382/155 |
| 7,460,709 B2 | 12/2008 | Grady et al. | | |
| 7,792,345 B2 * | 9/2010 | Taylor | ................ | G06K 9/00127 382/128 |
| 8,031,919 B2 * | 10/2011 | Eskildsen | ................ | G06K 9/48 128/922 |
| 8,036,424 B2 * | 10/2011 | Ishikawa | ................. | G06T 7/004 382/103 |

(Continued)

OTHER PUBLICATIONS

Richard Socher, Cliff Chiung-Yu Lin, Andrew Y. Ng, and Christopher D. Manning. Parsing natural scenes and natural language with recursive neural networkss. ICML, 129-136, 2011.

(Continued)

*Primary Examiner* — Yosef Kassa
(74) *Attorney, Agent, or Firm* — Gene Vinokur; James McAleenan; Hironori Tsukamoto (57) ABSTRACT

A method semantically labels an image acquired of a scene by first obtaining a local semantic feature for each local region in the image. The local semantic features are combined recursively to form intermediate segments until a semantic feature for the entire image is obtained. Then, the semantic feature for the entire image is decombined recursively into intermediate segments until an enhanced semantic feature for each local region is obtained. Then, each local region is labeled according to the enhanced semantic feature.

19 Claims, 5 Drawing Sheets

(56) References Cited

U.S. PATENT DOCUMENTS

| | | | |
|---|---|---|---|
| 8,055,018 B2 * | 11/2011 | Han | G06K 9/00248 |
| | | | 382/103 |
| 8,170,330 B2 | 5/2012 | Kiraly et al. | |
| 8,509,523 B2 * | 8/2013 | Schamp | B60R 21/0134 |
| | | | 340/425.5 |
| 2013/0343641 A1 | 12/2013 | Mnih et al. | |

OTHER PUBLICATIONS

Farabet et al., in "Learning hierarchical features for scene labeling," IEEE TPAMI, Aug. 2013.
Pedro H. O. Pinheiro and Ronan Collobert. Recurrent convolutional neural networks for scene parsing. ICML, 2014.
Bridle, "Training Stochastic Model Recognition Algorithms as Networks can lead to Maximum Mutual Information Estimation of Parameters," Advances in Neural Information Processing, pp. 211-217, 1990.

* cited by examiner

METHOD FOR SEMANTICALLY LABELING AN IMAGE OF A SCENE USING RECURSIVE CONTEXT PROPAGATION

FIELD OF THE INVENTION

This invention relates generally to image processing and more particularly to labeling images semantically.

BACKGROUND OF THE INVENTION

Semantic labeling is the task of generating pixel-wise labels for an acquired image in terms of semantic concepts such as tree, road, sky, water, and foreground objects. The semantic labeling problem can be formulated as a problem of mapping a set of nodes arranged on a 2D pixel grid representing the acquired image to their corresponding semantic concepts.

Semantic labeling can be achieved via a two step process: 1) feature extraction and 2) inference. Feature extraction retrieves descriptive information useful for semantic labeling under varying illumination and view-points. Generally, the features are colors, textures, or gradients. The features can be extracted from a local patch around each pixel. The inference predicts the labels of the pixels using the extracted features. The rich diversity in the appearance of even simple semantic concepts, such as sky, water, trees, or grass, makes automatic semantic labeling difficult.

Semantic labeling can use model-based methods or non-parametric methods for inference. Model-based methods learn the appearance of semantic categories and relations among the categories using a parametric model. Conditional random fields (CRF) can be used to combine unary potentials devised through visual features extracted from super-pixels with the neighborhood constraints. The differences among various CRF models are mainly in terms of the visual features, unary potentials and the structure of the CRF.

Non-parametric methods find images that are similar to the acquired image from a pre-labeled image database. The pixel labels of the found images are then copied to the acquired image, according to the similarity of the pixels. Because the variations in images of natural scenes are large, it is difficult to cover an entire space of conceptual variation with a reasonable size database, which limits the accuracy. On the other extreme, a large database would require a large retrieval-time, which limits the scalability of these methods.

In U.S. 20130343641, a neural network is trained to predict a probability that a pixel belongs to an object class by minimizing an objective function that a predicted posterior probability term for pixels in labeled aerial images differ from true labels for the pixels. That network only performs per pixel classification without propagating any information.

U.S. Pat. No. 7,460,709 describes a multi-label image segmentation method where edge weights and pixel based color potentials are used to label an image. That method labels by solving an optimization problem and by selecting a maximum of a potential function making the method slow.

U.S. Pat. No. 8,170,330 describes a learning based segmentation and labeling framework for processing tissue images. A classifier function for each label is evaluated for every pixel in the image. The functions operate separately on features originating from different pixels and do not use the context information.

SUMMARY OF THE INVENTION

The embodiments of the invention provide a method for sematically labeling an input image acquired of a scene. The method uses recursive context propagation. Local regions, e.g., one or more pixels or superpixels in the input image are classified according to local features extracted from the image. The local features are mapped to local semantic features. This is followed by recursively combining information about the local semantic features to form intermediate segments until a single semantic feature for the entire image is obtained. Then, the semantic feature for the entire image is recursively decombined in the reverse order of the combination to obtain enhanced semantic features of the intermediate segments, until enhanced semantic features of all the local regions are obtained. The enhanced semantic features contain context information from the entire image in addition to local information. Therefore, they are more descriptive. Then, the local regions can be classified and labeled according to the enhanced semantic features.

The semantic labeling is modeled as a mapping from pixels in the input image I to labels Y. The mapping includes the following advantages. The mapping is evaluated fast. The mapping captures the semantic context for the entire image such that every region influences the labels of every other regions in the image. The mapping easily scales to different image sizes, and the mapping parameters can be learned from training images.

The mapping is performed using a network of nodes where a capacity of the network is controlled through parameter sharing. All the network parameters are learned from the training data and the network structure enables very fast inference. The network can be used for local feature extraction and recursive context propagation.

DETAILED DESCRIPTION OF THE PREFERRED EMBODIMENTS

The embodiments of our invention provide a method for semantically labeling an input image acquired of a scene based on pixel features extracted from the image. The method uses recursive context propagation.

Figure 1:
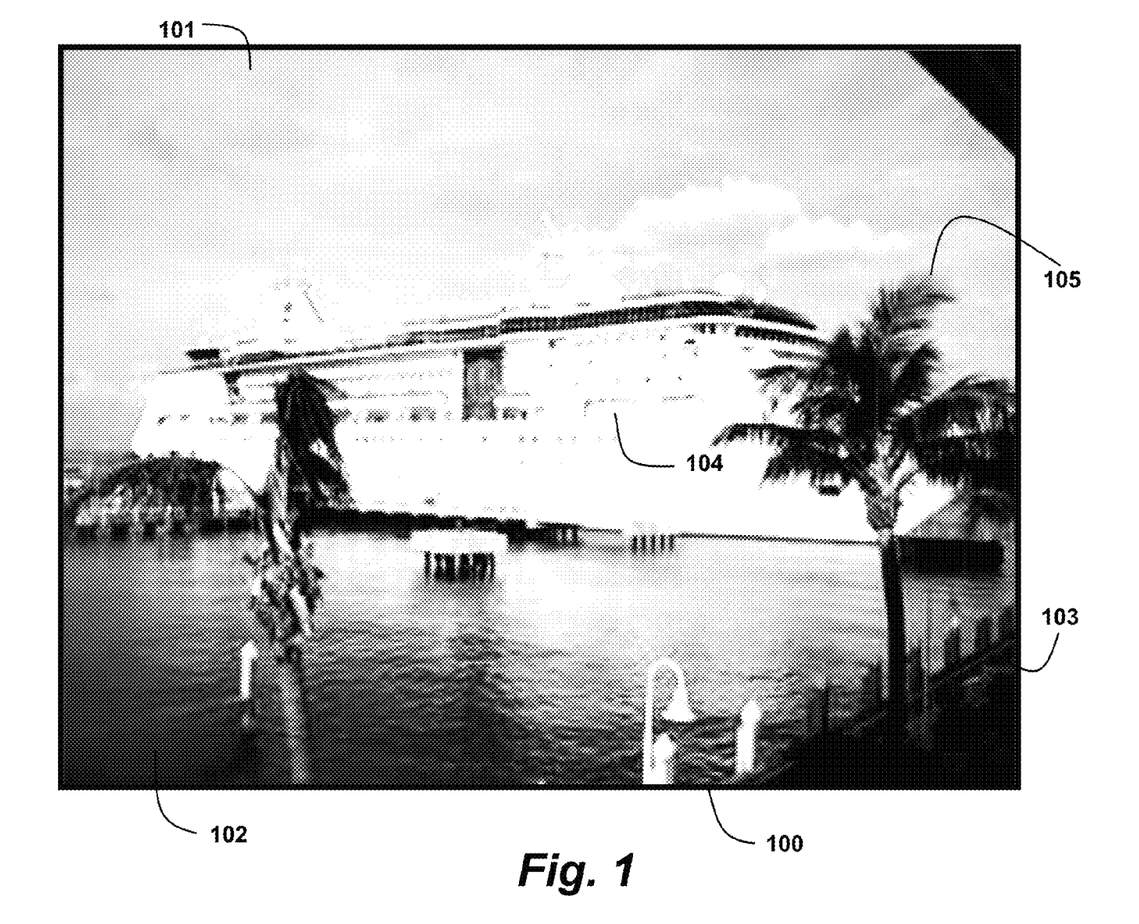
FIG. 1 is an example input image to be labeled according to embodiments of the invention.

As shown in FIG. 1, all the pixels of an acquired image 100 are labelled in terms of semantic concepts. A few example pixels and their semantic labels are shown including sky 101, water 102, dock 103, ship 104, and tree 105

Figure 2:
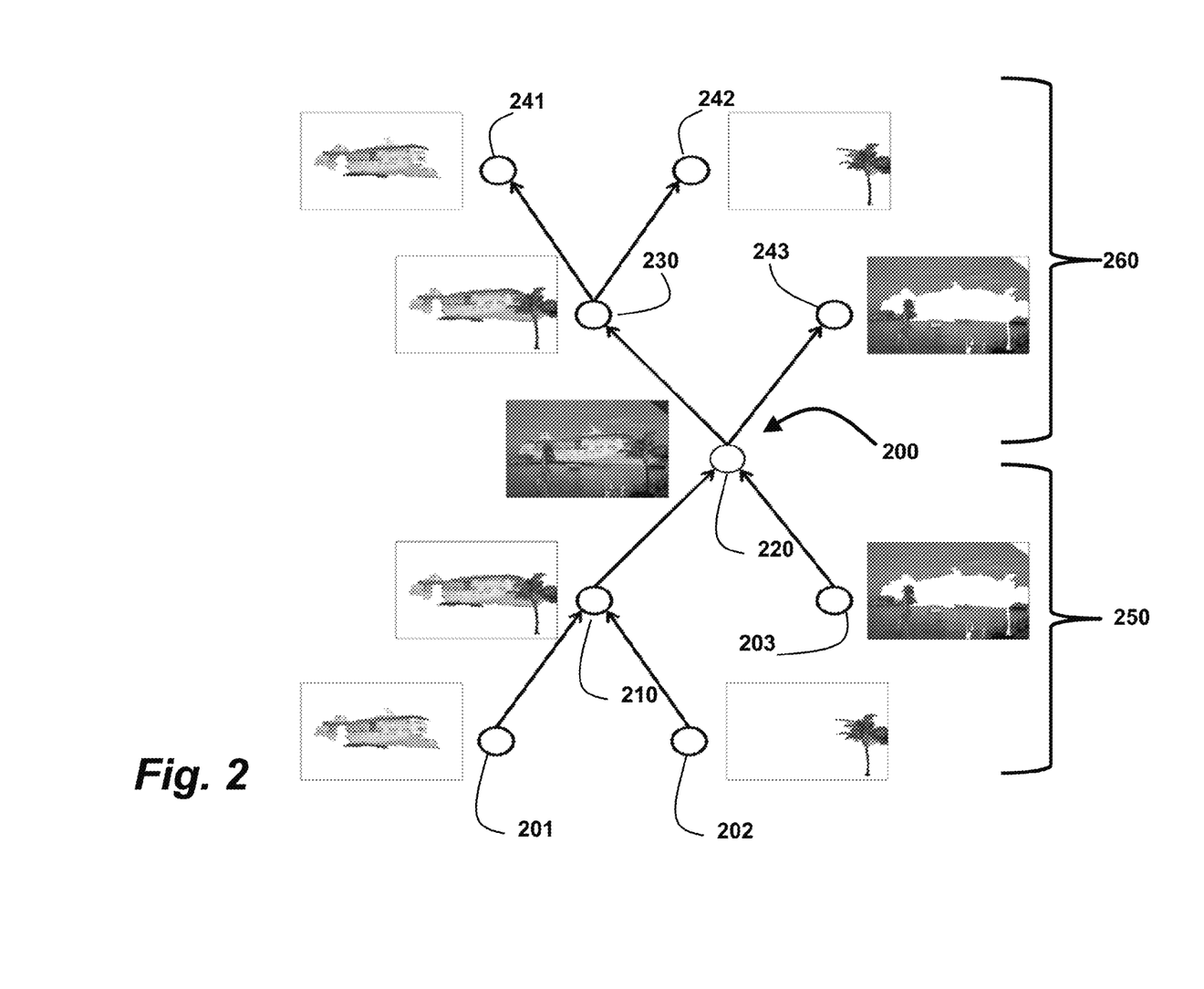
FIG. 2 is a schematic of a network according to embodiments of the invention.

FIG. 2 is a conceptual description of the embodiments of the invention. A parse tree 200 of the acquired image 100 is used for recursive context propagation. Nodes in the parse tree represent semantic features of the segments of the acquired image. Hence, combining 250 and decombining 260 segments corresponds to combining and decombining information about semantic features of the segments. Local semantic features 201, 202, 203 are recursively combined to form intermediate segments 210 until a semantic feature is obtained for the entire image 220. The semantic feature for the entire image 220 is decombined to form enhanced semantic features of the intermediate segments 230 until enhanced semantic features for all the local regions 241, 242, 243 are obtained. Then, the local segments can be labeled using their enhanced semantic features. The enhanced semantic features contain both local information and context information from the entire image.

Socher et al., "Parsing natural scenes and natural language with recursive neural," *ICML*, 129-136, 2011, describes a recursive structure that learns a non-linear mapping from a feature space to a semantic space, termed as semantic mapping. The recursive structure is learned by optimizing a prediction cost on ground-truth parse trees of training images. A classifier is learned on the semantic mappings of the individual local features from the training images. At test time, individual local features are projected to the semantic space using the learned semantic mapping followed by classification. Therefore, only the local information contained in individual features is used for labeling.

In contrast, we recursively propagate contextual information from local regions to global information for the entire image and then disseminate the global information back to the local regions, so that the local regions have both local and context information to use for labeling.

Network and Function

In the following, the terms "network" and "function" are used interchangeably. That is, a network can be implemented as a function F, and a function can be schematically represented as a network as shown in the figures.

Figure 3A:
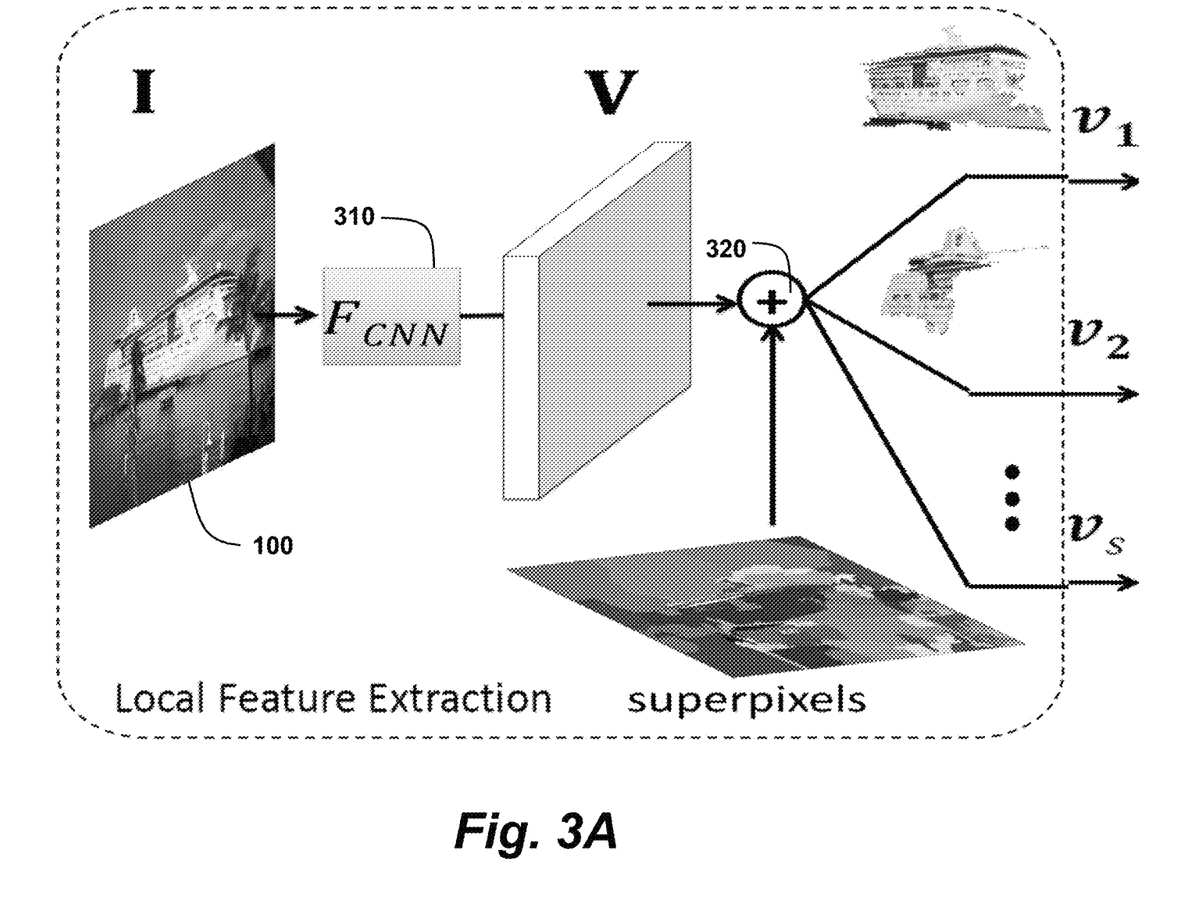
FIG. 3A is a schematic of local feature extraction to obtain local features according to embodiments of the invention.

FIG. 3A shows feature extraction from pixels in local regions to obtain local features according to embodiments of the invention. The local regions, can be one or more pixels or superpixels. The input image I 100 is fed to a multi scale convolutional neural network ($F_{CNN}$) 310, which extracts local features V for each pixel. We use superpixel tessellation to sum and average 320 the per-pixel local features within the same superpixel, e.g., $v_1$, $v_2$ and $v_3$.

Local Feature Extraction

We use multi scale convolutional neural network (Multi-CNN) for local feature extraction. As described by Farabet et al., in "Learning hierarchical features for scene labeling," IEEE TPAMI, August 2013, the Multi-CNN has convolutional stages are organized as 8×8×16 conv→
  2×2 maxpool→
    7×7×64 conv→
      2×2 maxpool→
        7×7×256 conv.

After each convolution, we apply a Rectified Linear Unit (ReLU) activation function. Unlike Farabet, we do not preprocess the input image, other than scaling the image between 0 to 1, and centering by subtracting 0.5.

We apply filters to the input image at three scales of a Gaussian pyramid. Feature maps at lower scales are spatially scaled up to the size of the feature maps at the highest scale and concatenated to obtain 256×3=768 dimensional features per pixel. The features are fed to a Softmax function for classification. The Softmax function is a generalization of a logistic function that maps a length-D vector of real values to a length-D vector of real values between 0.0 and 1.0, see Bridle, "Training Stochastic Model Recognition Algorithms as Networks can lead to Maximum Mutual Information Estimation of Parameters," Advances in Neural Information Processing, pp. 211-217, 1990. After training, we discard the final Softmax layer and retain the 768 dimensional features as local features. Note that the 768 dimensional concatenated output feature map is still ¼ of the height and width of the input image due to the max-pooling operation. To obtain the input image sized per-pixel feature map, we either shift the input image by one pixel on a 4×4 grid to obtain 16 output feature maps that are combined to obtain the full-resolution image, or scale-up each feature map by a factor of 4 in height and width.

Superpixel Representation

To reduce the complexity of our method shown in FIG. 3A, we use a superpixel segmentation procedure, which provides the desired number (K) of superpixels per image, e.g., K=100. This procedure uses pairwise color similarity and superpixel size constraints to produce homogenous superpixels with roughly similar sizes. We average the local features within the each superpixel and obtain $\{v_i\}$ local features, for i=1, K, one per superpixel.

Recursive Context Propagation

Figure 3B:
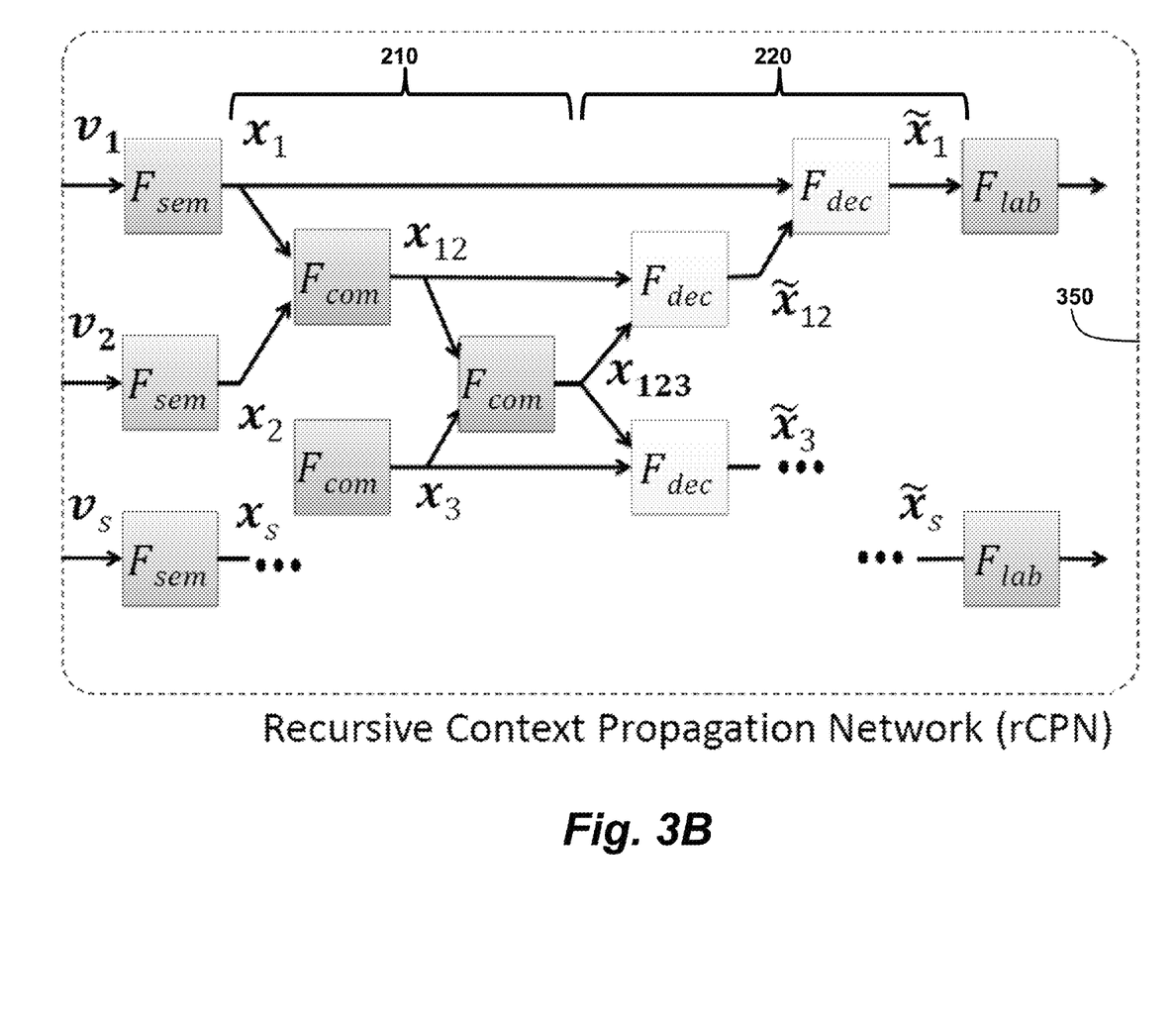
FIG. 3B is a schematic of a recursive context propagation network according to embodiments of the invention.

As shown in FIG. 3B, a recursive context propagation network (rCPN) 350 includes:

$F_{sem}$ maps the local region (pixel or superpixel) features to the local semantic features;

$F_{com}$ recursively combines the local semantic features to form intermediate segments until a semantic feature for the entire image is obtained;

$F_{dec}$ recursively decombines (disseminates) the semantic feature for the entire image into enhanced semantic features of the intermediate segments until enhanced semantic features for all the local regions are obtained; and $F_{lab}$ classifies and labels the local regions using the enhanced semantic features.

In FIG. 3B for example, $x_1$ and $x_2$ respectively represent one sematic feature derived from pixel features $v_1$ and $v_2$, $x_{12}$ represents a combined intermediate semantic feature derived from $x_1$ and $x_2$, and $\tilde{x}$ represents an enhanced semantic feature. Note that $\tilde{x}_1$ is derived from $x_1$, $x_{12}$, $x_{123}$ and $\tilde{x}_{12}$ due to the recursive combining 250 and decombining 260.

Parse Tree Synthesis

For training and inference, the binary parse trees that are used for propagating information through the network are synthesized from the image. We use an agglomerative clustering procedure to synthesize the trees by combining sub-trees, starting from a single node, where the combination is based on image neighborhood information. To reduce the complexity and to avoid degenerate solutions, the synthesis procedure gives preference to balanced parse trees, which may be achieved by greedily selecting subtrees with smaller heights with randomization. Note that the parse trees are only tools to propagate the contextual information throughout the image: the parse trees need not represent an accurate hierarchical segmentation of the image as in the prior art.

In one embodiment, semantic labeling of a part of the acquired image is performed where such part may be specified by the user via an image editing tool or it may be computed using other sensor modalities. Under this scenario, the parse tree only needs to represent the part of the acquired image.

Semantic Mapping Network

The semantic network $F_{sem}$ maps the local features to a $d_{sem}$ dimensional local semantic feature $$x_i = F_{sem}(v_i; \theta_{sem}),$$

where $\theta_{sem}$ is a semantic parameter. The goal of the semantic features is to acquire a joint representation of the local features and the semantic context, and to propagate this information to other superpixels.

Combiner Network

The combiner network $F_{com}$ recursively combines the semantic feature of two child nodes (superpixels) to obtain the semantic feature for a parent node $$x_{i,j} = F_{com}([x_i, x_j]; \theta_{com}),$$

where $\theta_{com}$ is a combining parameter, until the semantic feature of a root node correspond to a semantic feature for the entire image.

Decombiner Network

The decombiner network $F_{dec}$ recursively deseminates the semantic feature for the entire image by mapping the semantic features of the child node and its parent node to the contextually enhanced feature of the child node $$\tilde{x}_i = F_{dec}([\tilde{x}_{i,j}, x_i]; \theta_{dec}),$$

where $\theta_{dec}$ is a decombining parameter.

Because, we start from the semantic feature of the entire image and apply the decombiner network top-down recursively until we reach the local regions, it is expected that every enhanced local feature contains the contextual information aggregated from the entire image. Therefore, the local region is influenced by every other local region in the image.

Labeler Network

The labeler network $F_{lab}$ maps the enhanced semantic feature ($\tilde{x}_i$) of each local region to a semantic label $$y_i = F_{lab}(\tilde{x}_i; \theta_{lab}),$$

where $\theta_{lab}$ is a labeling parameter. Enhanced semantic features contain both local and context information.

Labeling Method

Figure 4:
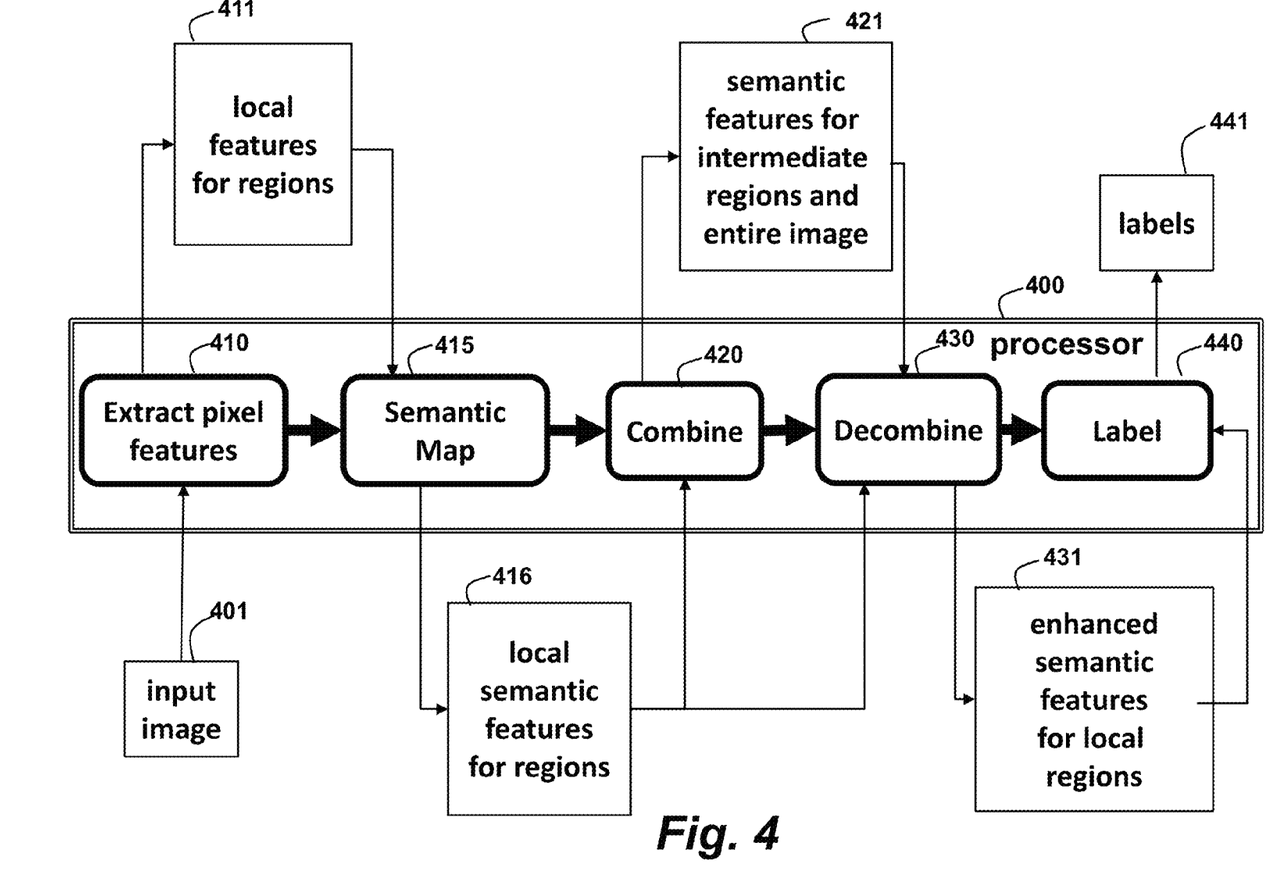
FIG. 4 is a flow diagram of a method for labeling an image according to embodiments of the invention.

FIG. 4 shows the method for semantically labeling an image 401 acquired of a scene. A local feature 411 is obtained by extracting 410 pixel features from pixels in local regions in the image. A local semantic feature 416 is obtained by semantically mapping 415 local features to a semantic space. The local semantic features are combined 420 recursively to form intermediate segments until a semantic feature for the entire image 421 is obtained. The semantic feature for the entire image is decombined 430 into the intermediate segments to obtain an enhanced semantic feature 431 for each region that is based on the local semantic feature and the context. Then, each local region is labeled 440 with labels 441 according the enhanced semantic feature.

In one embodiment, all the individual networks in rCPN, i.e., $F_{sem}$, $F_{com}$, $F_{dec}$ and $F_{lab}$, are implemented using one layer neural networks with ReLU non-linearity.

All the networks and functions, as well as the method steps described herein can be implemented in a processor connected to memory and input/output interfaces by buses as known in the art.

Side Information

Side information can be added to any node in the network. The side information can be used to encode static (non-recursive) knowledge about the nodes. The side information is not propagated. In one embodiment, the side information is an average of locations of the nodes and sizes of the nodes.

Training

The rCPN 350 and $F_{CNN}$ 310 could be jointly trained using training images. However, the recursions makes the depth of the networks too deep to perform joint training efficient. Therefore, we first learn parameters $\theta_{CNN}$ for $F_{CNN}$ 310 using the input image and ground truth segmentation labels. After the $F_{CNN}$ is trained, we obtain local features and train the parameters $$\theta_{rCPN} = [\theta_{sem} \theta_{com} \theta_{dec} \theta_{lab}]$$

to infer the ground labels for the local regions.

The feature extractor $F_{CNN}$ can be trained using a graphics processing unit (GPU). To avoid over-fitting, we used data augmentation and dropout. All the training images are mirrored to obtain double the number of training images. We also shift the training image by one pixel to increase the number of training images by an additional factor of two. We use dropout in the last layer with a dropout ratio of 0.5. Conventional back-propagation and a stochastic gradient descent update is applied to batches of six images, with a weight decay ($\lambda = 5 \times 10^{-5}$) and a momentum ($\mu = 0.9$). Simply using RGB images with the ReLU units and dropout gave slightly better pixel-wise accuracy as compared to Farabet et al.

The parameters of the rCPN are trained using a back-propagation through structure, which back-propagates the error through the parse tree from $F_{lab}$ to $F_{sem}$. The basic idea is to partition the error at each node and propagate the error to the child nodes. A limited memory Broyden-Fletcher-Goldfarb (BFGS) procedure with line-search is used for parameter updates.

We randomly sampled 5 pixels in a superpixel and averaged the pixel values to obtain 5 different features for each superpixel. We also use a different random parse tree for each set of random feature. Thus, we increased our training images by a factor of 5.

In essence, the learning minimizes a difference between true labels and predicted labels of the pixels in the training data.

Scene Classification

As described, the semantic feature of the root node (corresponding to the entire image) is a holistic representation of the scene. This semantic feature can be used for scene classification (classifying images according to scene categories e.g., nature photographs, face photographs, urban scenes, etc.), or for clustering of collections of images. The classification is achieved by training a classification model which takes the semantic feature of the root node and assigns to one of the scene categories. Clustering application uses semantic features of the root nodes of images in a photo collection and groups these images according to their similarities of semantic features.

Effect of the Invention

The embodiments of the invention provide a method for semantic labeling an image acquired of a scene. For the pixel-wise semantic labeling, we devise a novel network, which is a combination of a convolutional neural network and recursive neural network. A key feature is our recursive context propagation, which effectively propagates contextual information from one region of the image to all other regions in the image in a feed-forward manner. The networks are scalable and can be trained without using any human-designed features. The method outperforms prior art methods in terms of accuracy. The method is also orders of magnitude faster than prior art methods.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for semantically labeling an image acquired of a scene, comprising steps of:
    obtaining a local semantic feature from each local region in the image;
    combining recursively the local semantic features to form intermediate segments until a semantic feature for the entire image is obtained;
    decombining recursively the semantic feature for the entire image into intermediate segments until an enhanced semantic feature for each local region is obtained; and
    labeling each local region according to the enhanced semantic feature, wherein the steps are performed in a processor.

2. The method of claim 1, wherein the local regions are superpixels.

3. The method of claim 1, wherein the local regions include one or more pixels.

4. The method of claim 1, wherein the local features are extracted from local regions according to a multi scale convolutional neural network.

5. The method of claim 1, wherein the combining and the decombining are according to a parse tree of the image.

6. The method of claim 1, further comprising:
    synthesizing randomly balanced binary parse trees of nodes for the combining and the decombining.

7. The method of claim 1,
    where the mapping is according to $x_i = F_{sem}(v_i; \theta_{sem})$,
wherein $x_i$ is the semantic feature, $v_i$ is the local feature, and $\theta_{sem}$ is a semantic mapping parameter,
    where the combing is according to $x_{i,j} = F_{sem}([x_i, x_j]; \theta_{com})$,
wherein $x_{i,j}$ a semantic feature of a parent node obtained from child nodes $x_i, x_j$ in a binary parse tree, and $\theta_{com}$ is a combining parameter;
    where the decombining is according to $\tilde{x}_i = F_{dec}([\tilde{x}_{i,j}, x_i]; \theta_{dec})$,
wherein $\tilde{x}$ is an enhanced semantic feature of a child node obtained from a parent node $\tilde{x}_{i,j}$ and $x_i$, and $\theta_{sem}$ is a decombining parameter, and
    wherein the labeling is according to $y_i = F_{lab}(\tilde{x}_i; \theta_{lab})$,
wherein $y_i$ is a label, and $\theta_{sem}$ is a labeling parameter.

8. The method of claim 6, and further comprising:
    adding side information to the nodes.

9. The method of claim 8, wherein the side information encodes static knowledge about the nodes.

10. The method of claim 8, wherein the side information is an average of locations of the nodes and sizes of the nodes.

11. The method of claim 7, wherein the extracting, combining, decombining and labeling functions use neural network.

12. The method of claim 1, wherein the local semantic features are pixel color, gradient and texture features.

13. The method of claim 7, further comprising:
    learning the parameters of the extracting, the combining, the decombining and the labeling using training data.

14. The method of claim 13, wherein the learning minimizes a difference between true labels and predicted labels of the pixels in the training data.

15. The method of claim 7, wherein function of the combining and the decombining are recursive.

16. The method of claim 5, wherein the parse tree is a hierarchical segmentation representation of the image of the scene.

17. The method of claim 5, wherein the parse tree is a hierarchical segmentation representation of a part of the image of the scene.

18. The method of claim 1, wherein the semantic feature for the entire image is used to classify the image according to scene categories.

19. The method of claim 1, wherein the semantic feature for the entire image is used for clustering collections of images.

* * * * *